United States Patent Office 3,366,661
Patented Jan. 30, 1968

3,366,661
PROCESS FOR IMPROVING THE STORAGE
STABILITY OF 4,4' - DIISOCYANATODI-
PHENYLMETHANE
John David Anderson, Newark, Del., assignor to E. I.
du Pont de Nemours and Company, Wilmington, Del.,
a corporation of Delaware
No Drawing. Filed Aug. 29, 1963, Ser. No. 305,520
5 Claims. (Cl. 260—453)

ABSTRACT OF THE DISCLOSURE

This invention relates to a new process for producing storage stable 4,4'-diisocyanatodiphenylmethane, particularly the crude product obtained by the phosgenation of 4,4'-diaminodiphenylmethane. A process for producing 4,4'-diisocyanatodiphenylmethane which is substantially free of solids. The process comprises the steps of phosgenating 4,4'-diaminodiphenylmethane derived from aniline and formaldehyde; the resulting crude diisocyanatodiphenylmethane is then heated for less than one minute and then cooled to a temperature below 100° C. in less than one hour.

Crude 4,4' - diisocyanatodiphenylmethane containing phosgenation tars and varying amounts of polyisocyanates may be used to advantage in a number of applications including rigid polyurethane foams and adhesive formulations. The crude diisocyanate represents the undistilled product produced by the phosgenation of 4,4'-diaminodiphenylmethane, from which all or at least part of the phosgenation solvent has been removed by topping. The diamine used in the phosgenation may be refined by distillation or recrystallization, in which case the crude diisocyanate will contain phosgenation tars. However, the diamine used may be the undistilled product obtained from the aniline-formaldehyde condensation used in its preparation without further purification other than the removal of excess aniline. In this case, the crude diisocyanate will contain polyisocyanates, derived from polyamines, in the 4,4'-diaminodiphenylmethane, in addition to phosgenation tars.

Unfortunately, these crude forms of 4,4'-diisocyanatodiphenylmethane rapidly form solids during storage. This limits their usefulness because the solids interfere with handling and metering. In addition, the solids represent a loss of valuable diisocyanate and the presence of variable amounts of solids causes the behavior of the crude diisocyanate to be somewhat unpredictable.

It is known to chill refined 4,4'-diisocyanatodiphenylmethane from the temperature range of 50–70° C. about 0° C. and to store the product at the latter temperature. An improved storage procedure is reported in U.S. Patent 2,999,106 and involves cooling the distilled and thus refined diisocyanate from 50–70° C. to only 40–50° C. and maintaining the product at a temperature within the latter range. Although the second storage procedure is the generally preferred method for storing refined 4,4'-diisocyanatodiphenylmethane, neither it nor the chilling to 0° C. technique satisfactorily prevents the formation of solids in the crude diisocyanate during storage. Hence, a method for preventing the formation of solids in the crude diisocyanate is still needed.

It is therefore an object of the present invention to provide a process for the preparation of storage stable crude 4,4'-diisocyanatodiphenylmethane. A particular object of the present invention is to provide an improved process for obtaining crude 4,4'-diisocyanatodiphenylmethane which remains at least substantially free of solids during storage for extended period of time. Other objects will appear hereinafter.

These and other objects of the present invention are accomplished by the process which comprises generally heating the 4,4'-diisocyanatodiphenylmethane, which has been obtained by the phosgenation route, to a temperature of about 200–240° C., and thereafter rapidly cooling the diisocyanate to a temperature below about 100° C.

The process of the present invention is directed to improving the storage stability of crude 4,4'-diisocyanatodiphenylmethane and more specifically to reducing solids formation in the crude diisocyanate. By employing this process, it is possible to produce the crude diisocyanate which remains free of solids or contains only traces of solids after periods of storage of the duration which would normally be encountered in the manufacture, storage, distribution and use of an organic intermediate.

The process of the present invention is applicable to any crude grade of 4,4'-diisocyanatodiphenylmethane which has been produced by the solvent phosgenation of 4,4'-diaminodiphenylmethane. The phosgenation process disclosed by U.S. Patents 2,680,127; 2,822,373; and 2,908,703 are representative of the type processes which may be used to produce crudes which serve as starting material for the present process. Prior to treating such crudes according to the present invention, it is usually desirable to remove the major portion of the solvent employed in the phosgenation. Treatment of crude phosgenation mass according to the improved process can be carried out immediately following phosgenation and solvent topping, or it may be done at a later time on crudes which have already formed solids.

As previously indicated, the quality of the diamine used in the phosgenation can be varied widely from purified material to samples which represent the reaction product of an aniline-formaldehyde condensation with only excess aniline removed. In carrying out the aniline-formaldehyde condensation to prepare 4,4'-diaminodiphenylmethane it is customary to use at least 2.5 moles of aniline per mole of formaldehyde. This ratio of reactants furnishes somewhat more aniline than is required by stoichiometry. In actual practice, the use of this ratio produces products which may contain 20 to 30% of high boiling polyamines. If greater amounts of aniline are used relative to formaldehyde the diamine will contain smaller amounts of polyamines and a greater proportion of diamine. Other conditions employed in the condensation reaction may affect the relative proportion of diamine to polyamines. These conditions include the ratio of hydrochloric acid to aniline, the temperature of the reaction mass during the formaldehyde addition and the heating cycle employed to complete the condensation reaction.

The process of the present invention may be applied to any crude phosgenation product of 4,4'-diaminodiphenylmethane in which the major component is 4,4'-diisocyanatodiphenylmethane on a solvent free basis. It is not necessary to remove all solvent from crude phosgenation mass before heat-treating; however, it is preferable to remove enough solvent so that pressure will not be required to reach the high temperatures of the present process.

The heating step of the process of the present invention to a temperature of about 200–240° C. can include maintaining the crude diisocyanate at a temperature within this range for an extended period of time, for example about 10 hours. The heating step is believed to convert polymeric isocyanates, which appear to be responsible for the occurrence of solids in the desired isocyanate, to monomeric isocyanates, and hence the minimum temperature required is that which is necessary to achieve the conversion. The lower temperature limit of 200° C.

represents the minimum temperature at which the heat treatment is usually effective without requiring a measurable reaction time. The upper temperature limit of 240° C. is based on the rate of decomposition of 4,4'-diisocyanatodiphenylmethane. While temperatures above this upper limit may be used in the present process, decomposition of the diisocyanate may become so vigorous as to be hazardous on a large scale.

The optional step of holding the diisocyanate at an elevated temperature within the prescribed range is included in the present process, for it permits adjusting the isocyanato group content of the final product downward by means of controlled decomposition. The higher the temperature during this period and the greater its duration, the greater the reduction of isocyanato group content of the final product.

When this optional step is omitted or of short duration, the isocyanato group content is not reduced and may even increase. In many cases, the only residence time required at the elevated temperature will be provided by the heat-up and cool-down periods within the 200–240° C. range. Thus cooling may be initiated immediately after reaching a predetermined temperature in the 200–240° C. range. The increase in isocyanato group content is believed to result from the conversion of the minor proportion of polymeric materials to monomeric diisocyanate.

The most critical step of the process of the present invention is the step of cooling the crude diisocyanate from the elevated temperature range prescribed. This cooling must be done rapidly, with the preferred condition being almost instantaneous cooling, to a temperature below 100° C. As the cooling period is lengthened the storage stability of the crude diisocyanate decreases. If the cooling period is greater than about one hour, the product may show some improvement in storage stability, but solids formation will take place with sufficient rapidity to interfere with the use of the material in many applications. A preferred temperature to which the product is ultimately cooled and maintained is that temperature at which the entire product is still in the liquid state. Such temperature is generally in the range 25–45° C. As before, the preferred cooling rate to this range is that which is practically instantaneous.

The process of the present invention may be carried out in several types of equipment which are relatively conventional. On a small scale, the entire process may be performed batch-wise in small jacketed vessels or in small vessels equipped with coils for heating and cooling. Such vessels should also be provided with means for agitation so that heat transfer is good and uniform temperatures are maintained throughout the contents of the vessel. The manner of using such equipment for the present process is obvious. On a larger scale, where rapid heating and cooling are more difficult to achieve in agitated vessels, crude diisocyanate can be heated in an agitated vessel to the desired temperature, held at the high temperature as long as desired and then cooled rapidly by passing the hot material from the vessel through a heat exchanger into storage. By proper selection of the heat exchanger and the rate at which material is passed through it, very rapid cooling can be accomplished. This method has the disadvantage that different portions of a given batch of material have different heat histories. A similar method involves passage of hot diisocyanate from one vessel into a second vessel which already contains a heel of cool material. Material is introduced into the second vessel at a rate such that the temperature in the second vessel can be maintained by cooling supplied by a jacket or coils. This procedure also suffers from the disadvantage of exposing different portions of a charge to high temperatures for differing lengths of time. Both of these procedures also require that the diisocyanate be exposed to high temperatures for a considerable length of time, which will result in a loss of free isocyanato group content.

A preferred method for carrying out the present process employs two heat exchangers connected in series. Crude diisocyanate is passed through the heat exchangers at such a rate that material leaving the first exchanger, which is used for heating, has an exit temperature in the range of 200–240° C., while material leaving the second exchanger, which is used for cooling, exits at a temperature of less than 100° C. This arrangement of heat exchangers may be placed between storage vessels holding crude and heat-treated diisocyanate, or it may be connected directly to the facilities producing the crude diisocyanate. If it is desired to hold the material at an elevated temperature for a period of time, a vessel can be inserted in the line between the two exchangers and the high temperatures required in this vessel can be maintained by recirculating a portion of the contents of this vessel through the high temperature heat exchanger.

The crude 4,4'-diisocyanatodiphenylmethane produced by the process of the present invention may be used directly in numerous applications such as the preparation of rigid polyurethane foam. It may also be used in a variety of adhesive formulations. For this latter use, it is often convenient to dilute the diisocyanate with an inert solvent. These solutions, employing solvents such as chlorobenzene and o-dichlorobenzene, do not deposit solids when stored. Similar solutions of crude diisocyanate which have not been heat-treated deposit solids rapidly in storage.

The following examples in which parts and percents are by weight unless otherwise noted, are illustrative of the process of the present invention:

*Example 1*

Crude 4,4'-diaminodiphenylmethane, containing about 15% of polyamines, is prepared by the addition of 1 mole of aqueous formaldehyde to an aqueous solution of 3 moles of aniline and 2.8 moles of hydrochloric acid. The addition made at about 30° C. and followed by heating at 85° C. for 3 hours. The condensation mass is neutralized with sodium hydroxide, the organic layer is separated and excess aniline is removed by distillation at reduced pressure. The undistilled 4,4'-diaminodiphenylmethane plus polyamines is dissolved in o-dichlorobenzene and is converted to a mixture of isocyanates by treatment with phosgene. The phosgenation is accomplished by the process disclosed in U.S. 2,822,373. The o-dichlorobenzene is removed from the phosgenation mass by distillation at reduced pressure at a maximum temperature of 165° C. The crude 4,4'-diisocyanatodiphenylmethane produced in this manner contains about 72% diisocyanate. The remaining 28% of this crude diisocyanate represents a mixture of phosgenation by-products and polyisocyanates resulting from the phosgenation of the polyamines contained in the diamine used in the phosgenation. This material contains about 31% by weight of isocyanato groups when assayed by the procedure of ASTM D-1638-60T.

A portion of the crude 4,4'-diisocyanatodiphenylmethane is heated to 220° C. and maintained at that temperature for about 135 minutes. It is then cooled to about 45° C. in 5 minutes. After storage for 30 days at about 25° C., the crude diisocyanate contains less than 0.1% by volume of wet solids, determined by centrifuging for 30 minutes at 2000 r.p.m. in a Precision Scientific Company Centrifuge, Catalog Number 67342–G5.

A second portion of the crude diisocyanate is held at 200° C. for about 135 minutes. It is then cooled at a uniform rate over a period of about 10 hours to a temperature of 45° C. After storage for 30 days at about 25° C., the crude diisocyanate contains more than 5.0% by volume of wet solids, determined by centrifuging.

When crude diisocyanate, prepared as above, is stored for 30 days at 25° C. without any heat treatment, the wet solids content is more than 5% by volume.

Example 2

Crude 4,4'-diisocyanatodiphenylmethane, prepared as in Example 1, is heated to 225° C., and maintained at about 225° C. Samples of this material are removed after 30, 50, 70, 90, 110 and 130 minutes have elapsed from the time at which the crude diisocyanate reached 225° C. Each of these 6 samples is cooled below 100° C. within 5 minutes and then to room temperature within 30 minutes of its removal from the bulk of the diisocyanate. The samples are stored in air-tight containers at 25° C. At the end of 14 days, all samples are essentially free of solids.

Example 3

Crude 4,4'-diisocyanatodiphenylmethane, prepared as in Example 1, is heated at 220° C. for 25 minutes and cooled to below 100° C. in about 5 minutes and then to 25° C. in about 30 minutes. About 60 parts of this heat-treated material is mixed with 40 parts of chlorobenzene and the resulting solution is stored at 25° C. in an air-tight container. After 14 days storage, the sample is free of solids.

Similar results are obtained with a second chlorobenzene solution prepared from crude diisocyanate which has been heat-treated at 228° C. for 20 minutes, followed by rapid cooling.

A solution of 40 parts of chlorobenzene and 60 parts of crude diisocyanate which has not been heat-treated deposits a large quantity of solids after storage for 14 days at 25° C.

When these tests are repeated using o-dichlorobenzene in place of chlorobenzene, the results are essentially unchanged in regard to solids formation.

Example 4

Crude 4,4'-diisocyanatodiphenylmethane, prepared as in Example 1, is heated to 220° C. A sample of the crude is removed as soon as the temperature reaches 220° C. and additional samples are taken at 5-minute intervals until the total elapsed time at 220° C. equals 30 minutes. Each of the 7 samples, representing less than a minute, 5, 10, 15, 20, 25, and 30 minutes exposure to a temperature of 220° C., is cooled to below 100° C. in 5 minutes and then to about 25° C. within about 30 minutes after it is removed. Samples are stored in air-tight containers. After 30 days at room temperature, all samples are essentially free of solids.

Identical results are obtained when this test is conducted at 228° C. and 235° C., rather than 220° C.

Example 5

Crude 4,4'-diisocyanatodiphenylmethane, prepared as in Example 1, is heated to about 205° C. This material is split into two equal portions. The first portion is cooled to about 25° C. in about 30 minutes. The second portion is cooled at a uniform rate to 100° C. over a period of 6 hours and then rapidly to about 25° C. After 3 days storage at room temperature, the first portion is essentially free of solids and contains 29.1% by weight of isocyanato groups when assayed by ASTM D–1638–60T. After 3 days storage, the second portion contains more than 5% by volume of wet solids and has an isocyanato group content of 27.7% by weight. The isocyanato group content of the crude 4,4'-diisocyanatodiphenylmethane prior to heat-treating is 28.1% by weight. In this example, the heat-treatment followed by rapid cooling results in a 3.5% relative increase in available isocyanato groups.

Example 6

4,4'-diaminodiphenylmethane, which has been distilled to remove polyamines, is phosgenated in o-dichlorobenzene solution by the process of U.S. 2,822,373. Solvent is removed from the phosgenation mass by distillation at reduced pressure using a maximum temperature of 165° C. The resulting crude product contains 85% 4,4'-diisocyanatodiphenylmethane with the remainder of the sample consisting of phosgenation by-products.

A portion of this material is placed in an air-tight container and stored for 7 days at 40° C. At the end of this period, the sample contains a large amount of solid material. A second portion of this material is held at 228° C. for 30 minutes, cooled to 40° C. in about 30 minutes, and stored for 14 days at 40° C. Following storage, the heat-treated sample contains essentially no visible solids.

As many widely different embodiments of this invention may be made without departing from the spirit and scope thereof, it is to be understood that this invention is not limited to the specific embodiments thereof except as defined in the appended claims.

What is claimed is:

1. A method of producing 4,4'-diisocyanatodiphenylmethane which is substantially free of solids which comprises:
    (a) phosgenating 4,4'-diaminodiphenylmethane obtained by a process which comprises reacting aniline with formaldehyde to prepare crude 4,4'-diisocyanatodiphenylmethane
    (b) heating the resultant 4,4'-diisocyanatodiphenylmethane to a temperature of about 200–240° C. for less than a minute and then
    (c) cooling said 4,4'-diisocyanatodiphenylmethane to a temperature below about 100° C. in less than 1 hour.

2. A method for producing 4,4'-diisocyanatodiphenylmethane which is substantially free of solids which comprises:
    (a) phosgenating crude 4,4'-diaminodiphenylmethane to prepare a reaction mixture containing 4,4'-diisocyanatodiphenylmethane by a process which comprises reacting said crude 4,4'-diaminodiphenylmethane with phosgene,
    (b) heating the resulting diisocyanate to a temperature of about 200–240° C. for less than a minute and then
    (c) cooling said 4,4'-diisocyanatodiphenylmethane to a temperature below about 100° C. in less than 1 hour.

3. A process for improving the storage stability of crude 4,4'-diisocyanatodiphenylmethane which is obtained by phosgenation of 4,4'-diaminodiphenylmethane which comprises heating said crude diisocyanate to a temperature of about 200–240° C. for a time less than 10 hours, thereafter cooling said crude diisocyanate to a temperature below about 100° C. in less than 1 hour and thereby obtaining crude 4,4'-diisocyanatodiphenylmethane which is substantially free of solids for at least 30 days.

4. Process of claim 3 wherein said crude 4,4'-diisocyanatodiphenylmethane is cooled below 100° C. in less than 5 minutes.

5. Process of claim 4 wherein the crude 4,4'-diisocyanatodiphenylmethane is contained in an organic solvent.

References Cited

UNITED STATES PATENTS

| | | | |
|---|---|---|---|
| 2,999,106 | 9/1961 | Prosser et al. | 260—453 |
| 3,152,162 | 10/1964 | Fisher et al. | 260—453 |
| 3,274,225 | 9/1966 | Saunders et al. | 260—453 |

CHARLES B. PARKER, *Primary Examiner.*

D. MAHANAND, D. H. TORRENCE,
*Assistant Examiners.*